US006497956B1

(12) United States Patent
Phillips et al.

(10) Patent No.: US 6,497,956 B1
(45) Date of Patent: Dec. 24, 2002

(54) STRUCTURAL RECYCLED PLASTIC LUMBER

(75) Inventors: Thomas E. Phillips, Granville, OH (US); Prabhat Krishnaswamy, Columbus, OH (US)

(73) Assignee: Biolumber Inc., Orinda, CA (US)

( * ) Notice: Subject to any disclaimer, the term of this patent is extended or adjusted under 35 U.S.C. 154(b) by 0 days.

(21) Appl. No.: 09/948,750

(22) Filed: Sep. 7, 2001

(51) Int. Cl.$^7$ .................................................. D02G 3/00
(52) U.S. Cl. .................. 428/376; 264/913; 264/920; 523/200; 523/205; 523/214; 523/217
(58) Field of Search .......................... 428/376; 523/200, 523/202, 205, 214, 217; 264/920, 913

(56) References Cited

U.S. PATENT DOCUMENTS

| | | | |
|---|---|---|---|
| 4,441,944 A | 4/1984 | Massey | 156/71 |
| 5,212,233 A | 5/1993 | Mack et al. | 524/318 |
| 5,238,633 A | 8/1993 | Jameson | 264/211.23 |
| 5,300,704 A | 4/1994 | Evans et al. | 568/806 |
| 5,468,436 A | 11/1995 | Kirtland | 264/112 |
| 5,503,788 A | 4/1996 | Lazareck et al. | 264/115 |
| 5,565,158 A | 10/1996 | Sullivan et al. | 264/103 |
| 5,789,477 A | 8/1998 | Nosker et al. | 524/494 |
| 5,879,601 A | * 3/1999 | Baker | 264/112 |
| 5,916,932 A | 6/1999 | Nosker et al. | 523/204 |
| 6,054,207 A | 4/2000 | Finley | 428/317.9 |
| 6,131,355 A | 10/2000 | Groh et al. | 52/592.1 |

* cited by examiner

Primary Examiner—Robert Dawson
Assistant Examiner—D. Aylward
(74) Attorney, Agent, or Firm—Malcolm B. Wittenberg; Dergosits & Noah LLP

(57) ABSTRACT

Plastic lumber having sufficient stiffness and strength to allow its use in structural and load-bearing applications. The plastic lumber is composed of a thermoplastic polymer, a thermosetting polymer cured with reinforcing fibers and, preferably, a coupling agent and foaming or blowing agent. As a preferred embodiment, the thermosetting polymer and reinforcing fibers are sourced from recycled materials, specifically, sheet molding compounds and bulk molding compounds.

56 Claims, No Drawings

STRUCTURAL RECYCLED PLASTIC LUMBER

TECHNICAL FIELD OF INVENTION

The present invention deals with the fabrication of plastic lumber having sufficient stiffness and strength to allow its use in structural and load-bearing applications. Preferably, the plastic lumber is produced by the combination of a thermoplastic polymer together with a thermosetting polymer containing reinforcing fibers, such as fiberglass, the latter preferably being derived from recycled materials.

BACKGROUND OF THE INVENTION

It has been well recognized that a use for post-consumer recycled plastics has been in the production of "plastic lumber." Plastic refuse, particularly high density polyethylene (HDPE), such as commonly used to manufacture milk containers, may be recycled and re-molded as increasingly popular plastic-wood fly products. Such a scheme is disclosed in U.S. Pat. No. 5,212,223 wherein an extrudable composition is produced from waste polyolefins which can be made to closely resemble construction lumber. Such waste polyolefins can be derived from a wide variety of consumer products such as picnic tables, park benches, patio furniture and trash receptacles. However, because of the nature of its composition, plastic lumber made from HDPE, PVC, PP, or virgin resins has been characterized as having insufficient stiffness to allow its use in structural load-bearing applications. This deficiency is even more pronounced when plastic lumber is manufactured from waste plastics rather than virgin HDPE. For example, it is noted that non-reinforced plastic lumber products typically have a flexural modulus of only one-tenth to one-fifth that of wood such as Douglas fir.

The above-noted U.S. Pat. No. 5,212,223 discusses the inclusion of short glass fibers within reprocessed polyolefin and further teaches doing so to increase the stiffness of the non-reinforced plastic lumber by a factor of 3:4. However, none of the prior art known to applicant is capable of fabricating plastic lumber having the structural stiffness and strength of products made according to the present invention and having the further advantage in being capable of being fabricated from consumable waste.

SUMMARY OF THE INVENTION

The present invention is directed to a plastic lumber product and method for preparing it which is characterized as having sufficient stiffness and strength to allow its use in structural and load-bearing applications. The plastic lumber comprises, in combination, thermoplastic polymer, thermosetting polymer containing reinforcing fibers and, preferable, a coupling agent and a foaming or blowing agent. Ideally, the cured thermosetting polymer containing reinforcing fibers is derived from consumer waste which is characterized as being configured from thermosetting polymers which contain reinforcing fibers, such as fiberglass fibers, together with further additives incorporated therein for the particular use at hand.

DETAILED DESCRIPTION OF THE INVENTION

As noted, it has been common to incorporate polyolefins and other thermoplastics into a reconfigured mass to produce artificial lumber products. The present invention also contemplates using thermoplastics such as HDPE, ethylene vinyl acetate, polyethylene teraphthlate, polystyrene, and polyolefins such as linear low density polyethylene. However, the present invention does not merely contemplate including reinforcing fibers within such thermoplastics as was suggested by U.S. Pat. No. 5,212,223. Instead, applicant contemplates incorporating a protected source of reinforcing fibers by first incorporating such fibers within a thermosetting polymer, this latter combination being readily available by recycling consumer oriented products, such as sheet molding compounds, filament windings, such as rocket nozzles and chemical pipe, pultruded stock, such as fishing rods and ladder rails, resin transfer moldings, commonly found in furniture, continuous panels, spray up stock, such as boat hulls, and bulk molding compounds. This combination provides plastic lumber with the stiffness and strength of natural wood of similar dimensions. In addition, the plastic lumber of the present invention may be used safely in a wide range of high-performance structural applications possibly replacing wood especially where exposure to moisture, insects and rotting may be a problem. For example, when manufactured according to the present invention, such composite plastic lumber components may be utilized for joists, beams, stringers and other structural components and may be especially useful in the construction of decks, cooling towers, boardwalks and bridges in marine and waterfront applications. Such products are characterized as not requiring any staining or other protective treatment throughout their effective service lives, estimated to be fifty years or more. Further, such products may themselves be recyclable when no longer in service.

As noted above, as its preferred embodiment, the present invention contemplates the use of consumer-oriented recycled products which are composed of thermosetting polymer containing fiber reinforcement. One excellent source for such material is post-automotive waste (PAW) such as that employed in the manufacture of fiberglass-bodied vehicles such as the Corvette. R.J. Marshall, Inc. of Southfield, Mich. offers PAW in granulated form ideal for combining with a suitable thermoplastic as recited above in order to produce the plastic lumber product of the present invention. It is noted that there are virtually unlimited numbers of sources for such recycled reinforced thermosetting plastic compounds. For example, such diverse products as boat hulls and fiberglass reinforced shower stalls can be employed. In doing so, such reinforced thermosetting plastic compounds are first granulated and then combined with a suitable thermoplastic. This can be done by any well known extruding technique such as the use of a screw extruder as discussed in U.S. Pat. No. 5,212,223, the disclosure of which is incorporated by reference.

The thermosetting polymer can comprise an epoxy, polyester and/or vinyl ester. As examples, suitable polyesters include synthetic resins which are the polycondensation products of dicarboxylic acids, such as maleic or fumaric, phthalic and isophthalic acids, and dihydroxy alcohols, such as ethylene, diethylene, propylene, dipropylene and neopentyl glycols cross-linked with monomeric styrene. Examples of suitable epoxies include the condensation products of epichlorohydrin, and bisphenol A reacted with an amine or anhydride. Suitable vinyl esters include ethyl methacrylates cross-linked with monomeric styrene. Vinyl esters can also include the reaction product of an epoxy resin and a monofunctional ehtylenically unsaturated carboxylic acid. The epoxy resin is usually epoxylated bisphenol A-epichlorhydrin or epoxylated phenol-formaldehyde novolac as recited by Dow Chemical in the "Handbook of Plastic Materials and Technology" Irvin I. Rubin, Editor, published by Wiley Interscience.

The thermoplastic component of the present invention can also be sourced from waste consumables. For example, HDPE is typically used in the manufacture of plastic milk containers and is a suitable source for such materials for use herein. Alternatively, virgin polyolefin resins and other virgin thermoplastics can be used as the matrix for the plastic wood of the present invention. As a composition, it has been determined that, ideally, the finished product contain approximately 30% fiber loading. As such, from the typical waste plastics contemplated for use herein, approximately 50% by weight of the thermosetting polymer/reinforcing fiber combination is employed based upon the total weight of the finished lumber product.

To some degree, the relative amount of the thermosetting waste plastic compounds is somewhat dependent upon the weight percent of reinforcing fiber contained therein. In practicing the present invention, it is also suitable to enhance the amount of reinforcing fibers by adding virgin fibers to the recycled plastic compounds such that the thermosetting waste plastic which is granulated and the granulated plastic waste together with the virgin fibers extruded with the thermoplastic component as noted above. Another source of glass fibers is waste reinforced thermoplastics such as glass fiber reinforced polypropylene, an example of which is Azdel® sold by General Electric.

In addition to the polymeric components and fiber reinforcement, the present invention also contemplates the use of coupling agents such as modified polyolefins, examples of which are maleated polyethylene, maleated polypropylene, maleated styrene-ethylene-butene-styrene triblock copolymer, maleated polybutadiene, copolymers of ethylene with acrylic and methacrylic acid as well as graft copolymers of polyolefins with polar monomers and functionalized silanes. An excellent source of the maleic anhydride modified linear high density polyethylene is a product sold under the trademark Polybond 3009 available from Crompton Corp. The use of such coupling agents is advantageous in that they enhance the tensile and flexural strength of the artificial lumber product.

Foaming or blowing agents generally incorporated in amounts up to 3% by weight may be introduced into the mix primarily to reduce the density of the artificial lumber product and also to "size" the product to the required dimensions in the extrusion process. Suitable foaming or blowing agents include, for example Safoam FPE 50 available from Reedy International Corp. Further foaming or blowing agents include exothermic blowing agents such as azodicarbonamide, 4-4 oxy-bis(benzene sulfonyl hydraziole), p-toluene sulfonyl semicarbazide, phenyl tetrazole and endothermic blowing agents such as inorganic carbonates and bicarbonates including magnesium carbonate and bicarbonate.

Additionally, the present composition can also include a heat stabilizing compound such as calcium/phosphate derivative hindered phenol sold under the trademark Recyclostab 411 by Ciba Geigy Chemicals. The heat stabilizing compound can also be a member selected from the group consisting of hydroxyamines, phenols, phosphates and metal soaps and be included in any amount up to 1% by weight based upon the weight of the total composition to prevent degradation of the artificial lumber product due to heat histories.

The plastic lumber product can further comprise an antioxidant. Suitable antioxidants include alkylated phenols and bis-phenols such as hindered phenols, polyphenols, thio and di-thio polyalkylated phenols, lactones such as 3-arylbenzofuran-2-one and hydroxyl-amine as well as Vitamin E.

In preparing the final product, it is contemplated that the fiber reinforced thermosetting polymer be granulated and combined with a suitable thermoplastic and the combination introduced into either a single screw or twin screw extruder using conventional plastic extrusion technology to produce "dimensional" lumber in any size required. Such processing conditions are well known to those who generally manufacture polyolefin-based thermoplastic extrusions.

It is noted that the artificial lumber of the present invention may be manufactured to any dimension including traditional structural dimensions such as, for example, 2×2, 2×4, 2×6, etc. Sizes may also be selected so as to provide the same or similar stiffness and strength as a wooden board of a particular dimension. Tests have shown that artificial lumber produced by combining post-automotive waste and high density polyethylene, either alone, or with the use of additional reinforcing glass fibers, increases the flexural modulus, the main shortcoming of non-reinforced high density polyethylene, by as much as 300% when post-automotive waste/BMC (bulk molding compound) is included in quantities as little as 5% by weight. For example, it has been determined that a 2×6 inch composite plastic lumber component of the present invention can safely be used as joists and beams to span lengths in excess of ten feet or more in buildings, boardwalks, docks and decks. Variations in glass fiber and post-automotive waste/BMC content can produce artificial lumber components that may used in structural applications requiring spans of ten feet or more.

We claim:

1. Plastic lumber having sufficient stiffness and strength to allow its use in structural and load-bearing applications, said plastic lumber comprising in combination, a thermoplastic polymer and a thermosetting polymer cured containing reinforced fibers where said thermoplastic polymer comprises a member selected from the group consisting of high density polyethylene, ethylene vinyl acetate, polyethylene terephthalate, polystyrene and linear low density polyethene.

2. Plastic lumber having sufficient stiffness and strength to allow its use in structural and load-bearing applications, said plastic lumber comprising in combination, a thermoplastic polymer and a thermosetting polymer cured containing reinforcing fibers wherein said thermosetting polymer comprises a member selected from the group consisting of epoxies, polyesters and vinyl esters.

3. Plastic lumber having sufficient stiffness and strength to allow its use in structural and load-bearing applications, said plastic lumber comprising in combination, a thermoplastic polymer and a thermosetting polymer cured containing reinforcing fibers.

4. The plastic lumber of claim 3 wherein said thermoplastic polymer comprises a member selected from the group consisting of high density polyethylene, ethylene vinyl acetate, polyethylene terephthalate, polystyrene and linear low density polyethylene.

5. The plastic lumber of claim 3 wherein said thermosetting polymer comprises a member selected from the group consisting of epoxies, polyesters and vinyl esters.

6. The plastic lumber of claim 2 wherein said polyesters comprise one or more synthetic resins selected from the group consisting of polycondensation products of dicarboxylic acids and dihydroxy alcohols cross-linked with a monomeric styrenes.

7. The plastic lumber of claim 2 wherein said epoxies comprise one or more members selected from the group consisting of condensation products of epichlorohydrin and bisphenol A reacted with an amine or anhydride.

8. The plastic lumber of claim 2 wherein said vinyl esters comprise one or more members selected from the group consisting of ethyl methacrylates cross-linked with monomeric styrene.

9. The plastic lumber of claim 3 wherein said reinforcing fibers comprise fiberglass.

10. The plastic lumber of claim 6 wherein said dicarboxylic acid comprises one or more members selected from the group consisting of maleic, fumaric, phthalic and isophthalic acid and said dihydroxy alcohol comprises one or more members selected from the group consisting of ethylene, diethylene, propylene, dipropylene and neopentyl glycols.

11. The plastic lumber of claim 3 further comprising a modified polyolefin coupling agent selected from the group consisting of maleated polyethylene, maleated polypropylene, maleated styrenethylene-butene-styrene triblock copolymer, maleated polybutadiene, copolymers of ethylene with acrylic and methacrylic acid inorganic carbonates and graft copolymers of polyolefins, polar monomers and functionalized silanes.

12. The plastic lumber of claim 3 further comprising a heat stabilizing compound selected from the group consisting of hydroxyamines, phenols, phosphates and metal soaps.

13. The plastic lumber of claim 3 wherein said thermosetting polymer and reinforcing fibers are derived from recycled materials.

14. The plastic lumber of claim 3 wherein said thermosetting polymer is cured containing said reinforcing fibers prior to blending said thermosetting polymer with said thermoplastic polymer.

15. The plastic lumber of claim 14 wherein said thermosetting polymer containing said reinforcing fibers is granulated prior to blending with said thermoplastic polymer.

16. The plastic lumber of claim 13 wherein said thermosetting polymer and reinforcing fibers comprises recycled materials selected from the group consisting of sheet molding compounds, filament windings, pultruded stock, resin transfer moldings, continuous panels, spray up stock, and bulk molding compounds.

17. The plastic lumber of claim 16 wherein said sheet molding compound comprises post-automotive waste.

18. A method of producing plastic lumber having sufficient stiffness and strength to allow its use in structural and load-bearing applications comprising providing thermosetting polymer and reinforcing fibers from recycled materials and combining said recycled materials with a thermoplastic polymer.

19. The process of claim 18 wherein a coupling agent and a foaming or blowing agent is further combined with said thermoplastic polymer.

20. The process of claim 18 wherein said recycled materials are one or more members selected from the group consisting of sheet molding compounds, filament windings, pultruded stock, resin transfer moldings, continuous panels, spray up stock, and bulk molding compounds.

21. The process of claim 18 wherein said recycled materials are granulated prior to blending with said thermoplastic.

22. The process of claim 18 wherein said recycled materials are derived from post-automotive waste.

23. The plastic lumber of claim 6 wherein said polycondensation products of dicarboxylic acids comprise a member selected from the group consisting of an maleic, fumaric, phthalic and isophthalic acids.

24. The plastic lumber of claim 6 wherein said dihydroxy alcohols comprise a member selected from the group consisting of ethylene, diethylene, propylene, dipropylene and neopentyl alcohols.

25. The plastic lumber of claim 11 wherein said inorganic carbonates comprise magnesium carbonate and magnesium bicarbonate.

26. The plastic lumber of claim 3 further comprising an antioxidant selected from the group consisting of alkylated phenols, bis-phenols, poly-phenols, thio polyalkylated phenols, di-thio poly-alkylated phenols and lactones.

27. The plastic lumber of claim 26 wherein said lactones comprise a member selected from the group consisting of 3-arylbenzofuran-2-one, hydroxylamine and Vitamin E.

28. The plastic lumber of claim 1 wherein said reinforcing fibers comprise fiberglass.

29. The plastic lumber of claim 2 wherein said reinforcing fibers comprise fiberglass.

30. The plastic lumber of claim 1 further comprising a modified polyolefin coupling agent selected from the group consisting of maleated polyethylene, maleated polypropylene, maleated styrene-ethylene-butene-styrene triblock copolymer, maleated polybutadiene, copolymers of ethylene with acrylic and methacrylic acid, inorganic carbonates and graft copolymers of polyolefins, polar monomers and functionalized silanes.

31. The plastic lumber of claim 2 further comprising a modified polyolefin coupling agent selected from the group consisting of maleated polyethylene, maleated polypropylene, maleated styrene-ethylene-butene-styrene triblock copolymer, maleated polybutadiene, copolymers of ethylene with acrylic and methacrylic acid, inorganic carbonates and graft copolymers of polyolefins, polar monomers and functionalized silanes.

32. The plastic lumber of claim 1 further comprising a heat stabilizing compound selected from the group consisting of hydroxyamines, phenols, phosphates and metal soaps.

33. The plastic lumber of claim 2 further comprising a heat stabilizing compound selected from the group consisting of hydroxyamines, phenols, phosphates and metal soaps.

34. The plastic lumber of claim 1 wherein said thermosetting polymer and reinforcing fibers are derived from recycled materials.

35. The plastic lumber of claim 2 wherein said thermosetting polymer and reinforcing fibers are derived from recycled materials.

36. The plastic lumber of claim 1 wherein said thermosetting polymer is cured containing said reinforcing fibers prior to blending said thermosetting polymer with said thermoplastic polymer.

37. The plastic lumber of claim 2 wherein said thermosetting polymer is cured containing said reinforcing fibers prior to blending said thermosetting polymer with said thermoplastic polymer.

38. The plastic lumber of claim 1 wherein said thermosetting polymer containing said reinforcing fibers is granulated prior to blending with said thermoplastic polymer.

39. The plastic lumber of claim 2 wherein said thermosetting polymer containing said reinforcing fibers is granulated prior to blending with said thermoplastic polymer.

40. The plastic lumber of claim 34 wherein said thermosetting polymer and reinforcing fibers comprises recycled materials selected from the group consisting of sheet molding compounds, filament windings, pultruded stock, resin transfer moldings, continuous panels, spray up stock, and bulk molding compounds.

41. The plastic lumber of claim 35 wherein said thermosetting polymer and reinforcing fibers comprises recycled materials selected from the group consisting of sheet molding compounds, filament windings, pultruded stock, resin transfer moldings, continuous panels, spray up stock, and bulk molding compounds.

42. The plastic lumber of claim 40 wherein said sheet molding compound comprises post-automotive waste.

43. The plastic lumber of claim 41 wherein said thermosetting polymer and reinforcing fibers comprises recycled materials selected from the group consisting of sheet molding compounds, filament windings, pultruded stock, resin transfer moldings, continuous panels, spray up stock, and bulk molding compounds.

44. A method of producing plastic lumber having sufficient stiffness and strength to allow its use in structural and load-bearing applications comprising providing thermosetting polymer and reinforcing fibers from recycled materials and combining said recycled materials with a thermoplastic polymer wherein said thermoplastic polymer comprises a member selected from the group consisting of high density polyethylene, ethylene vinyl acetate, polyethylene terephthalate, polystyrene and linear low-density polyethylene.

45. A method of producing plastic lumber having sufficient stiffness and strength to allow its use in structural and load-bearing applications comprising providing thermosetting polymer and reinforcing fibers from recycled materials and combining said recycled materials with a thermoplastic polymer, said thermosetting polymer comprising a member selected from the group consisting of epoxies, polyesters and vinyl esters.

46. A method of producing plastic lumber having sufficient stiffness and strength to allow its use in structural and load-bearing applications comprising providing thermosetting polymer and reinforcing fibers from recycled materials and combining said recycled materials with a thermoplastic polymer and further comprising a coupling agent and a foaming or blowing agent is further combined with said thermoplastic polymer.

47. The process of claim 44 wherein said recycled materials comprise one or more members selected from the group consisting of sheet molding compounds, filament windings, pultruded stock, resin transfer moldings, continuous panels, spray up stock, and bulk molding compounds.

48. The process of claim 45 wherein said recycled materials comprise one or more members selected from the group consisting of sheet molding compounds, filament windings, pultruded stock, resin transfer moldings, continuous panels, spray up stock, and bulk molding compounds.

49. The process of claim 44 wherein said recycled materials are granulated prior to blending with said thermoplastic.

50. The process of claim 45 wherein said recycled materials are granulated prior to blending with said thermoplastic.

51. The process of claim 44 wherein said recycled materials are derived from post-automotive waste.

52. The process of claim 45 wherein said recycled materials are derived from post-automotive waste.

53. The plastic lumber of claim 30 wherein said inorganic carbonates comprise magnesium carbonate and magnesium bicarbonate.

54. The plastic lumber of claim 31 wherein said inorganic carbonates comprise magnesium carbonate and magnesium bicarbonate.

55. The plastic lumber of claim 1 further comprising an antioxidant selected from the group consisting of alkylated phenols, bis-phenols, poly-phenols, thio polyalkylated pheols, di-thio poly-alkylated phenols and lactones.

56. The plastic lumber of claim 2 further comprising antioxidant selected from the group consisting of alkylated phenols, bis-phenols, poly-phenols, thio polyalkylated pheols, di-thio poly-alkylated phenols and lactones.

\* \* \* \* \*